United States Patent
Tata et al.

(10) Patent No.: US 10,713,291 B2
(45) Date of Patent: Jul. 14, 2020

(54) ELECTRONIC DOCUMENT GENERATION USING DATA FROM DISPARATE SOURCES

(71) Applicant: Accenture Global Solutions Limited, Dublin (IE)

(72) Inventors: Swati Tata, Bangalore (IN); Madhura Shivaram, Bangalore (IN); Deepak Kumar, Bangalore (IN); Guruprasad Dasappa, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 112 days.

(21) Appl. No.: 15/729,157

(22) Filed: Oct. 10, 2017

(65) Prior Publication Data

US 2018/0268053 A1    Sep. 20, 2018

(30) Foreign Application Priority Data

Mar. 14, 2017   (IN) .............................. 201741008697

(51) Int. Cl.
    *G06F 17/20*    (2006.01)
    *G06F 16/34*    (2019.01)
    *G06F 40/166*   (2020.01)
    *G06F 40/247*   (2020.01)
    *G06F 40/284*   (2020.01)

(52) U.S. Cl.
    CPC .......... *G06F 16/345* (2019.01); *G06F 40/166* (2020.01); *G06F 40/247* (2020.01); *G06F 40/284* (2020.01)

(58) Field of Classification Search
    CPC combination set(s) only.
    See application file for complete search history.

(56) References Cited

U.S. PATENT DOCUMENTS

| | | | | |
|---|---|---|---|---|
| 2002/0078091 A1* | 6/2002 | Vu | ........................ | G06F 16/353 715/203 |
| 2002/0194230 A1* | 12/2002 | Polanyi | ................... | G06F 40/30 704/9 |
| 2004/0225667 A1* | 11/2004 | Hu | ........................ | G06F 16/345 |
| 2009/0157382 A1* | 6/2009 | Bar | ...................... | G06F 40/289 704/8 |
| 2010/0036697 A1* | 2/2010 | Kelnar | ................. | G06Q 10/063 705/7.11 |

(Continued)

*Primary Examiner* — Shahid K Khan
(74) *Attorney, Agent, or Firm* — Fish & Richardson P.C.

(57) ABSTRACT

Implementations are directed to providing an electronic document, and include receiving text content including a plurality of segments, the text content being received from data sources, determining a set of topics to be included in the electronic document, for each topic in the set of topics, providing a set of contextual words associated with a respective topic, contextual words being determined from a lexical database, each contextual word having a respective frequency, determining a score for each segment and topic pair, the score indicating a relevance of a respective topic to a respective segment, each score being determined based on respective contextual words of the respective topic and frequencies of the respective contextual words, for each topic, providing, by the one or more processors, a summary including at least one segment based on respective score, and providing, to a user device, the electronic document including one or more summaries.

18 Claims, 12 Drawing Sheets

(56) References Cited

U.S. PATENT DOCUMENTS

| | | | |
|---|---|---|---|
| 2011/0087671 A1* | 4/2011 | Lee | G06F 16/345 |
| | | | 707/741 |
| 2013/0117297 A1* | 5/2013 | Liu | G06F 16/3322 |
| | | | 707/767 |
| 2013/0246430 A1* | 9/2013 | Szucs | G06F 16/313 |
| | | | 707/738 |
| 2014/0040275 A1* | 2/2014 | Dang | G06F 16/2228 |
| | | | 707/741 |
| 2014/0129210 A1* | 5/2014 | Convertino | G06F 16/353 |
| | | | 704/9 |
| 2014/0250375 A1 | 9/2014 | Malik | |
| 2015/0067460 A1 | 3/2015 | Beaumont | |
| 2016/0026621 A1* | 1/2016 | Misra | G06F 17/2785 |
| | | | 704/9 |

\* cited by examiner

ELECTRONIC DOCUMENT GENERATION USING DATA FROM DISPARATE SOURCES

CROSS-REFERENCE TO RELATED APPLICATION

This application claims priority to Indian Patent Application No. 201741008697, filed on Mar. 14, 2017, entitled "ELECTRONIC DOCUMENT GENERATION USING DATA FROM DISPARATE SOURCES," the entirety of which is hereby incorporated by reference.

BACKGROUND

Enterprises often gather and analyze data to make decisions. Data in the form of structured data and unstructured data may be scattered across multiple databases, file servers, and user devices from both internal, and external data sources. Structured data may be contained in databases, while unstructured data, such as documents and emails, may be stored on file servers. Creating, searching, retrieving, and maintaining data in such an environment is complex and expensive. Thus, providing meaningful correlations and summarizations of such data is difficult, and can be resource-intensive, in terms of technical resources (e.g., processors, memory, network bandwidth) to retrieve, analyze, and summarize the data.

SUMMARY

Implementations of the present disclosure are generally directed to retrieving and analyzing data from disparate sources, and providing an electronic document summarizing the data, and/or analysis. More particularly, implementations of the present disclosure are directed to processing data from internal and external data sources to identify segments within each data source, and topics described by the data sources to provide electronic documents that include information relating to requested topics from specified data sources.

In some implementations, actions include receiving text content including a plurality of segments, the text content being received from one or more data sources, determining a set of topics to be included in the electronic document, the set of topics including one or more topics, for each topic in the set of topics, providing a set of contextual words associated with a respective topic, contextual words being determined from a lexical database, each contextual word having a respective frequency, determining a score for each segment and topic pair, the score indicating a relevance of a respective topic to a respective segment, each score being determined based on respective contextual words of the respective topic and frequencies of the respective contextual words, for each topic, providing, by the one or more processors, a summary including at least one segment based on respective score, and providing, to a user device, the electronic document including one or more summaries. Other implementations of this aspect include corresponding systems, apparatus, and computer programs, configured to perform the actions of the methods, encoded on computer storage devices.

These and other implementations can each optionally include one or more of the following features: the contextual words for each of the identified topics include words included in one or more of a definition of a respective topic, an example of the respective topics, and a synonym of the respective topic in the lexical database; the contextual words for each identified topics are synonyms, hypernyms, or a part of speech related to a respective topic; stop words are removed from results of the lexical database; a frequency of a respective contextual word is based on a frequency of the respective contextual word within the lexical database; the transitions within the text content between the identified keywords are identified through a meta-path approach; the text content is retrieved from at least one data source of the one or more data sources; and at least one data source includes a document source uploaded from a user device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
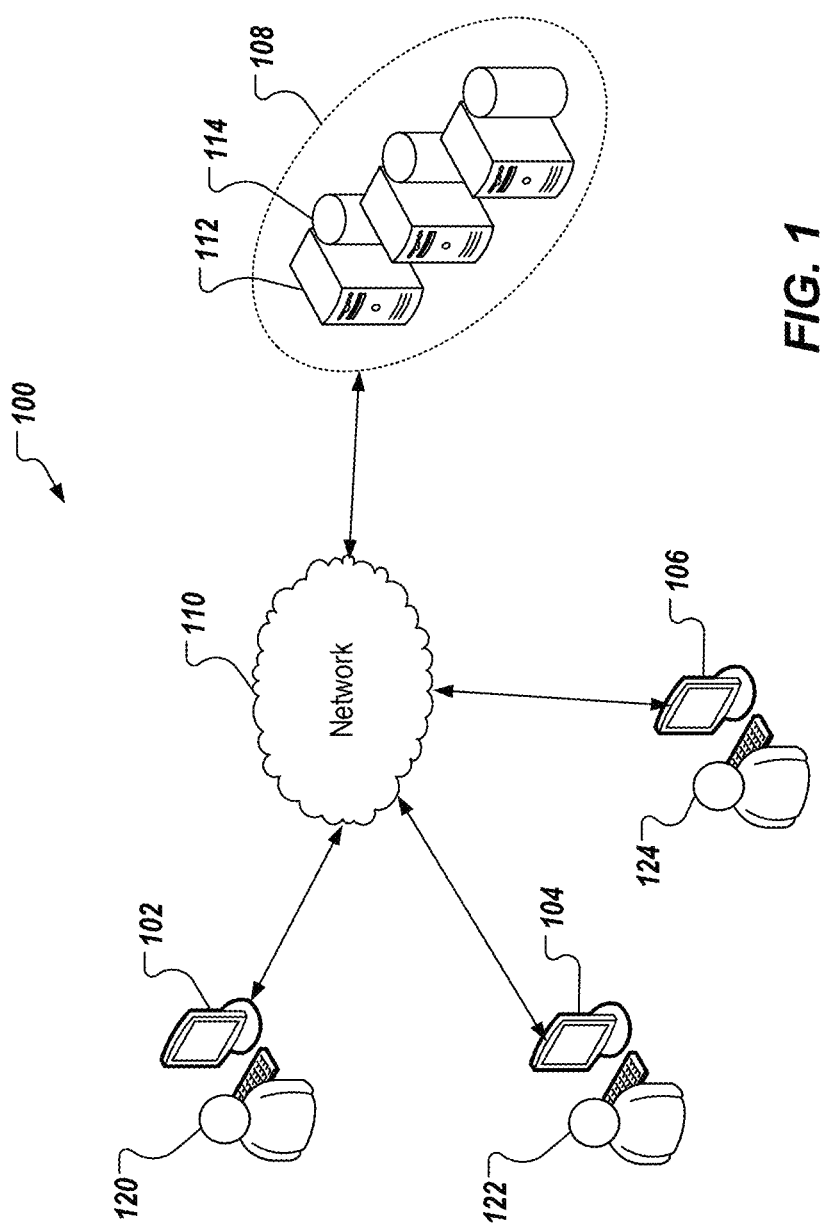
FIG. 1 depicts an example high-level architecture in accordance with implementations of the present disclosure.

Implementations of the present disclosure are generally directed to retrieving and analyzing data from disparate sources, and providing an electronic document summarizing the data, and/or analysis. More particularly, implementations of the present disclosure are directed to processing data from internal and external data sources to identify segments within each data source, and topics described by the data sources to provide electronic documents that include information relating to requested topics from specified data sources.

In some implementations, actions include providing an electronic document, and include receiving text content including a plurality of segments, the text content being received from one or more data sources, determining a set of topics to be included in the electronic document, the set of topics including one or more topics, for each topic in the set of topics, providing a set of contextual words associated with a respective topic, contextual words being determined from a lexical database, each contextual word having a respective frequency, determining a score for each segment and topic pair, the score indicating a relevance of a respective topic to a respective segment, each score being determined based on respective contextual words of the respective topic and frequencies of the respective contextual words, for each topic, providing, by the one or more processors, a summary including at least one segment based on respective score, and providing, to a user device, the electronic document including one or more summaries.

Implementations of the present disclosure are described in further detail herein with reference to an example context. The example context includes generating market intelligence reports as electronic documents. It is contemplated, however, that implementations of the present disclosure can be realized in any appropriate context.

In the example context, market intelligence can be described as the capturing of information relevant to markets. This can involve the gathering, analyzing, and disseminating of information that is relevant to market segments in which an enterprise participates, or seeks to participate. The combination of data and analysis for the purpose of accurate and confident decision-making provides information to determine, for example, market opportunity, market penetration strategy, and market development metrics.

Intelligence reporting systems can process data from a variety of disparate internal and/or external data sources to calculate, for example, dependencies and correlations between the collected information, and to provide reports that correlate and visualize processed information. In the example domain of market intelligence, data sources may contain information regarding, for example, web analytics, business intelligence, call center metrics, accounting, and product data. Among other things, the provided reports enable, for example, agents of the enterprise to view current key performance indicators (KPIs) in real-time (or as quickly as sources provide data), and analyze trends. In this manner, agents need not wait for publishing of periodic reports.

As described in further detail herein, implementations of the present disclosure address challenges in providing analysis reports in the form of electronic documents. In particular, implementations of the present disclosure provide for collecting data from various internal and/or external data sources to extract text data therefrom, identifying segments (sections) within the text data based on one or more topics, and sub-topics, and generating a summarization report as an electronic document in a time, and resource-efficient manner. In some examples, segments are summarized and scored based on relevance to respective topics (and/or sub-topics). The indexed information may be used by, for example, an intelligence reporting system to provide the reports as electronic documents that include information relating to requested topics from specified data sources. In the example context, a procurement team may use provided electronic document(s) to decide strategies regarding, for example, how to purchase commodities for their organization.

FIG. 1 depicts an example system 100 that can execute implementations of the present disclosure. The example system 100 includes computing devices 102, 104, 106, a back-end system 108, and a network 110. In some implementations, the network 110 includes a local area network (LAN), wide area network (WAN), the Internet, or a combination thereof, and connects web sites, devices (e.g., the computing device 102, 104, 106), and back-end systems (e.g., the back-end system 108). In some implementations, the network 110 can be accessed over a wired and/or a wireless communications link. For example, mobile computing devices, such as smartphones, can utilize a cellular network to access the network 110.

In the depicted example, the back-end system 108 includes at least one server system 112, and data store 114 (e.g., database). In some implementations, the at least one server system 112 hosts one or more computer-implemented services that users can interact with using computing devices. For example, the server system 112 can host a computer-implemented service for generating electronic documents in accordance with implementations of the present disclosure. In some implementations, back-end system 108 represents computer systems utilizing clustered computers and components to act as a single pool of seamless resources when accessed through a network. For example, such implementations may be used in data center, cloud computing, storage area network (SAN), and network attached storage (NAS) applications. In some implementations, back-end system 108 represents a virtual machine.

In some implementations, the computing devices 102, 104, 106 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In accordance with implementations of the present disclosure, respective users 120, 122, 124 of the computing devices 102, 104, 106 can interact with the back-end system 108 to generate electronic documents in accordance with implementations of the present disclosure. For example, and as described in further detail herein with reference to FIGS. 3A-3I, one or more of the users 120, 122, 124 can interact with the back-end system 108 through respective graphical user interfaces (GUIs), which enable selection of data sources, topics, and sections of report generation, among other functions.

Figure 2:
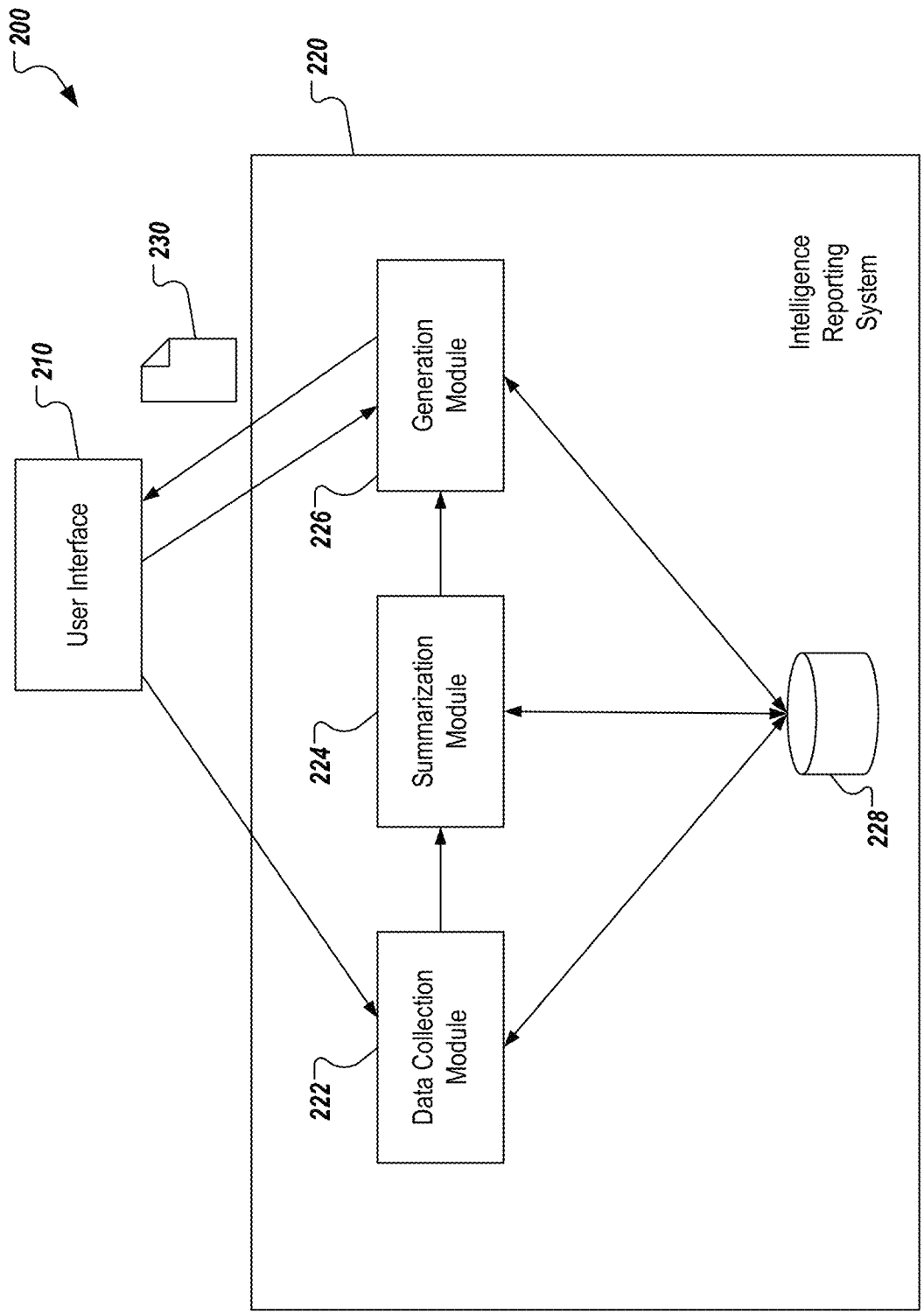
FIG. 2 schematically depicts an example electronic document generation platform in accordance with implementations of the present disclosure.

FIG. 2 schematically depicts an example electronic document generation platform 200 in accordance with implementations of the present disclosure. The example platform 200 may be implemented on a back-end system, such as back-end system 108 of FIG. 1. In the depicted example, the example platform 200 includes a user interface 210, and an intelligence reporting system 220. In the depicted example, the intelligence reporting system 220 includes a data collection module 222, a summarization module 224, an electronic document generation module 226, and a database 228. In some examples, one or more of the data collection module 222, the summarization module 224, and the electronic document generation module 226 may be provided as one or more computer-executable programs executed by one or more computing devices (e.g., the server system 112 of FIG. 1).

In some implementations, a user (e.g., users 120, 122, 124 of FIG. 1) interact with the intelligence reporting system 220 through the user interface 210. For example, the user interface 210 can be displayed by a computing device (e.g., the computing devices 102, 104, 106 of FIG. 1). The user interface 210 may be accessed through, for example, a browser application running on the computing device. The computing device may access the user interface 210 over a network (e.g., the network 110 of FIG. 1). In some implementations, the user interface 210 enables a user to select and/or identify data sources and/or topics to the intelligence reporting system 220. As described in further detail herein, the intelligence reporting system 220 uses the data collection module 222 to crawl the identified data sources for content (e.g., text), and retrieves relevant content.

In some implementations, the intelligence reporting system 220 identifies segments within the retrieved content (text data) based on one or more selected topics (and/or sub-topics). The identified segments may be summarized and indexed based on scores generated for each of the identified topics. In some examples, topics are grouped into categories. Categories may be employed within the user interface 210 to provide context regarding the overall content of the indexed data sources, as well as for search and browse capabilities accessed through the user interface 210. The indexed data sources, topics, and categories may be selected by a user through the user interface 210 to generate an electronic document(s) containing segments and respective summaries relevant to the selected topics and/or categories.

In some implementations, one or more data sources available for searching can be pre-defined (e.g., by a system administrator (or by a user) through the user interface 210), which data sources are to be indexed by the intelligence reporting system 220. In some examples, a data source may be using any appropriate mechanisms input to the user interface 210. For example, a data source can be identified based on a uniform resource locator (URL) assigned to the data source, or can be provided as one or more files uploaded through the user interface 210. A URL is a reference to a web resource that specifies a location of the data source on a computer network, as well as a mechanism for retrieving the data source.

The user interface 210 enables users to interact with the intelligence reporting system 220. In some implementations, the user interface 210 provides a list of available data sources, as well as a list of categories with corresponding topics within each category that may be selected by the user. In some implementations, the user may select various data sources and topics (or categories), which are to be used to generate an electronic document by the intelligence reporting system 220. As described in further detail herein, the electronic document generation module 226 of the intelligence reporting system 220 provides an electronic document 230 based on the user selections. The provided electronic document can contain segments and respective summaries from the selected data sources that are relevant to the selected topics and/or categories.

In some examples, a data source can be identified using a third-party search engine that is accessed by the intelligence reporting system 220 (e.g., through an application program interface (API)). For example, the user can input a search query including one or more search terms into a search box of the user interface 210, the search query can be transmitted to the third-party search engine, and search results can be received from the third-party search engine. The search results can include one or more data sources (e.g., web sites) that can be selected by the user for retrieving content (text data), as described herein.

In some examples, the user may provide data source(s) and/or a topic(s) not listed within the with the user interface 210 in addition to, or instead of selections made from the provided lists (e.g., English-language list). Segments identified within any user-provided data sources may be summarized and indexed for the electronic document provided to the intelligence reporting system 220, as well as for generation of any subsequent electronic documents. In some examples, user-provided topics and categories, and/or topics identified in user-provided data sources may also be added to the intelligence reporting system 220 (e.g., as respective indices within the database 228).

The user interface 210 may enable the user to manually edit electronic documents provided by the intelligence reporting system 220. Electronic documents provided by the intelligence reporting system 220 and/or edited by a user, may be stored by the intelligence reporting system 220 in, for example, the database 228. In some examples, the electronic document can be associated with a profile of the user.

In some implementations, the user interface 210 may be provided as a GUI, example GUIs being described in further detail herein with reference to FIGS. 3A-3I. A GUI is generally presented as a field region in an image and may serve to facilitate interaction with a system, such as the intelligence reporting system 220. In some examples, a GUI may be provided through an application, such as a web browser, executing on a computing device, and displayed to by a user. GUI conveys information to the user and provides an interaction mechanism, through which the user might command the related system or computer, such as the intelligence reporting system 220. Example GUIs of the user interface 210 are described in further detail herein with reference to FIGS. 3A-3I.

In some implementations, the data collection module 222 extracts content from identified data sources. Example data sources can include electronic documents and/or web content containing unstructured text. Electronic documents may be files created by a software application and may include, web content retrieved from a URL. Electronic documents may be provided in a text format such American Standard Code for Information Interchange (AC SIT) or Unicode. Provided or retrieved content may also be in other file formats, such as Portable Document Format (PDF), Microsoft Word format, Hypertext Markup Language (HTML), Extensible Markup Language (XML), Microsoft Excel format, or any appropriate format. Web content may be retrieved directly from a URL, such as a URL pointing to a website, a news feed article, a file from a digital library, a blog, a forum, or a digital book. The data source may be provided by a system administrator or by a user of the intelligence reporting system 220 through, for example, the user interface 210.

In some implementations, the data collection module 222 uses document scraping and crawling tools to retrieve content from the data sources. In some examples, document scraping tools process a data source (e.g., a retrieved web document or a provided document), extract information for the data source, and provide the extracted information in a pre-determined format (e.g., ACSII, Unicode). In some examples, document crawling tools process a provided data source, such as a web page, discover links within the data source, and retrieve the content provided at the discovered links. Further, a data source may be crawled by removing elements such as stop words, tokens, stems, and tags.

In some implementations, the summarization module 224 parses the extracted text to build a set of initial keywords (e.g., topics, sub-topics). In some examples, the summarization module 224 employs a meta-path approach using the set of keywords identified from the extracted text. The set of keywords may be used to identify segments within each data source. The summarization module 224 uses the initial set of keywords and a lexical database (e.g., WordNet) to identify various topics described in the retrieved content. In some implementations, topics are identified by determining definitions (or senses) for each of the identified keywords that are relevant to the content. Contextual words for each identified topic are determined. In some implementations, the contextual words for a topic are determined using the lexical database.

In some implementations, each segment identified within the content is scored. In some examples, the score is representative of a relevance of the segment to a respective topic. As described in further detail herein, the scores can be based on linguistic and contextual identification within a respective segment. In some implementations, the identified segments are summarized for each topic that is determined to be relevant based on respective score. The identified topics may also be grouped into categories. Each segment and summary may be indexed in, for example, the database 228 based on relevant topics and/or categories.

As an example, a particular product or commodity may be selected as a category for various topics identified within a data source(s). These topics may include for example, manufactures and distributors of the product or commodity. These topics may be grouped within the category. In some implementations as described above, the identified categories and topics may be displayed within the user interface 210 such that that a user may select a topic or a category to generate an electronic document that includes segments from selected data sources relevant to the selected topic and/or category. Selected topics and/or categories are provided to the electronic document generation module 226 to facilitate the generation of the electronic document (report).

In some implementations, topics that were not included in the selected list, but entered directly by a user may be received through the user interface 210. The entered topic(s) are provided to the summarization module 224, which determines the segments from content of the selected data sources relevant to the entered topic(s). The identified relevant segments are provided to the electronic document generation module 226. The relevant segments are indexed based on the entered topic(s), and are stored in the database 228. In this manner, the electronic document generation module 226 can retrieve the relevant segments to generate an electronic document for the selected topics and data sources. The entered topics may also be added to any existing or newly determined categories, which may be indexed in the database 228.

In some implementations, one or more traditional techniques for determining segments in text can be used. An example technique can include TextTiling, which generally includes using of patterns of lexical co-occurrence and distribution. More particularly, TextTiling includes tokenization into terms and sentence-sized units, determination of a score for each sentence-sized unit, and detection of subtopic boundaries (segments), which are assumed to occur at the largest valleys in the graph that results from plotting sentence-units against scores.

In some implementations, the electronic document generation module 226 receives segments of the text data that are determined to be related to one or more selected topics. In some examples, the electronic document generation module 226 constructs an electronic document in a determined format that includes the identified segments to provide a summary for each topic. The electronic document may be formatted such that a user may view and/or edit the electronic document within the user interface 210. Example formats include, but are not limited to, Microsoft Word, PDF, simple text formats (e.g., ASCII, Unicode), Rich Text Format ("RTF"), HTML, and XML.

In some implementations, topics provided to electronic document generation module 226 may range from broad (e.g., a company, a product) to narrow (e.g., the largest supplier of a particular product within a particular region). For example, the electronic document generation module 226 may receive one or more topics relating to the revenue for a given company over a particular period of time. The electronic document generation module 226 retrieves the index segments, and respective summarizations regarding this topic to include in an electronic document. In the example context, other topic examples include locations that manufacture a product, all the suppliers of a product in a given region, market share for a particular vendor or grouping of vendors, technology innovation in a given technology space, etc.

The database 228 may be hosted by a back-end system (e.g., the back-end system 108 of FIG. 1). In some implementations, the database 228 is used to store, for example, segments and summaries of content retrieved from one or more data sources. The segments are identified, summarized, and indexed based on one or more topics contained in each segment. The database 228 can be implemented using any appropriate database architecture, such as a relational database, an object-oriented database, and/or one or more tables.

As introduced above, the intelligence reporting system 220 may employ a lexical database. An example lexical database includes WordNet provided by Princeton University, of Princeton, N.J. In some examples, a lexical database models lexical knowledge of a native speaker of a language (e.g., English, Spanish, Japanese, German, French). Information in the lexical database is organized as a network of word sense nodes, where each node is a group of synonyms called synsets. Each sense (e.g., definition) of a word may be mapped to a synset (a sense word). A synset may be used as a basic building block of a respective language. Word sense nodes in can be linked by a variety of semantic relationships. Further, the semantic relationship can be synonymy, or a semantic relationship between word forms. The lexical database can define a relation between lexical concepts known as a hyponymy. For example, the noun strawberry is a hyponym (subordinate) of the noun fruit. Conversely, fruit is a hypernym (superordinate) of strawberry. The lexical database can employ the semantic relationship to organize nouns into a lexical hierarchy.

In accordance with implementations of the present disclosure, each topic is provided as input to the lexical database. For example, one or more topics can be provided as input through an API of the lexical database. The lexical database can process each topic to provide a list of contextual words associated with the topic. In some examples, the contextual words include words provided in a definition of the topic, synonyms of the topic, words provided in definitions of respective synonyms, and words provided in one or more examples, hyponyms of the topic, words provided in definitions of respective hyponyms, and words provided in one or more examples of hyponymns, hypernyms of the topic, words provided in definitions of respective hypernyms, and words provided in one or more examples of the hypernyms. In some examples, stop words (e.g., the, it, a, an, of, etc.) can be excluded from the list of contextual words. In some examples, the list of contextual words includes the topic itself.

In some examples, each contextual word in the list of contextual words includes a frequency assigned thereto. In some examples, the frequency indicates a number of times that the contextual word appears in definitions of the topic, definitions of respective synonyms of the topic, and examples that the topic is used in.

In accordance with implementations of the present disclosure, each segment of text data is scored for a topic based on the list of contextual words provided for the topic. More particularly, text data can include a set of segments S→[$s_1, \ldots s_n$], and a set of topics T→[$t_1, \ldots, t_m$] can be indicated by the user. A similarity score ($R_{si,tq}$) is determined for each segment ($s_i$; i=1, ..., n) and topic ($t_q$; q=1, ..., m) pair (e.g., [$s_i, t_q$]). In some examples, the similarity score is determined based on comparing the contextual words in the list of contextual words for a respective topic to words in the respective segment.

In some implementations, the similarity score is initially set at a minimum value (e.g., zero). For each match between a contextual word and a contextual word, the similarity score is incremented. In some examples, a degree to which the similarity score is incremented can depend on the frequency associated with the contextual word. For example, a first contextual word can include a first frequency, and a second contextual word can include a second frequency that is lower than the first frequency. A first word of the segment can be determined to match the first contextual word. Consequently, the similarity score is incremented by a first increment. A second word of the segment can be determined to match the second contextual word. Consequently, the similarity score is incremented by a second increment. The second increment is less than the first increment.

In accordance with implementations of the present disclosure, each segment of the text data is associated with one or more similarity scores, each similarity score indicating a similarity of the segment to a respective topic. For example, an example segment $s_1$ can include a set of similarity scores $R_{s1}$→[$R_{s1,t1}, R_{s1,t2}$] for respective topics $t_1, t_2$. In some examples, each similarity score can be compared to a similarity score threshold ($R_{THR}$) to determine whether the respective segment is to be included in the resulting report for the respective topic. Continuing with the example above, it can be determined that $R_{s1,t1}$, exceeds $R_{THR}$, but that $R_{s1,t2}$ does not exceed $R_{THR}$. Consequently, within the resulting report, the segment $s_1$ is provided for the topic $t_1$, but is not provided for the topic $t_2$.

In some implementations, a summary is provided for each topic as a concatenation of segments that are determined to be sufficiently relevant (similar) to the respective topic (e.g., based on similarity scores). In some examples, a report is provided as a collection of summaries. For example, a report can include a first summary of a first topic, and a second summary of a second topic. In some examples, the topic is provided as a header to a paragraph that includes the summary as a collection of segments.

It should be understood that, for illustrative purposes, FIG. 2 does not show other computer systems and elements which may be present when implementing the present disclosure. For example, the intelligence reporting system 220 may be deployed on a single computer system, or may be deployed in a computing environment that includes interconnected computer systems, on which data and programs are hosted or through an environment created by various virtual machines and services. Additional modules not illustrated in FIG. 2 may also be included and are to be considered within the scope of the present disclosure.

FIGS. 3A-3I depict example user interfaces in accordance with implementations of the present disclosure. The example user interfaces can be displayed as GUIs within the user interface 210 of FIG. 2, for example, to enable a user to interact with the intelligence reporting system 220 of FIG. 2. In some implementations, the example GUIs are provided using one or more computer-executable programs executed by one or more computing devices (e.g., the back-end system 108 of FIG. 1).

Figure 3A:
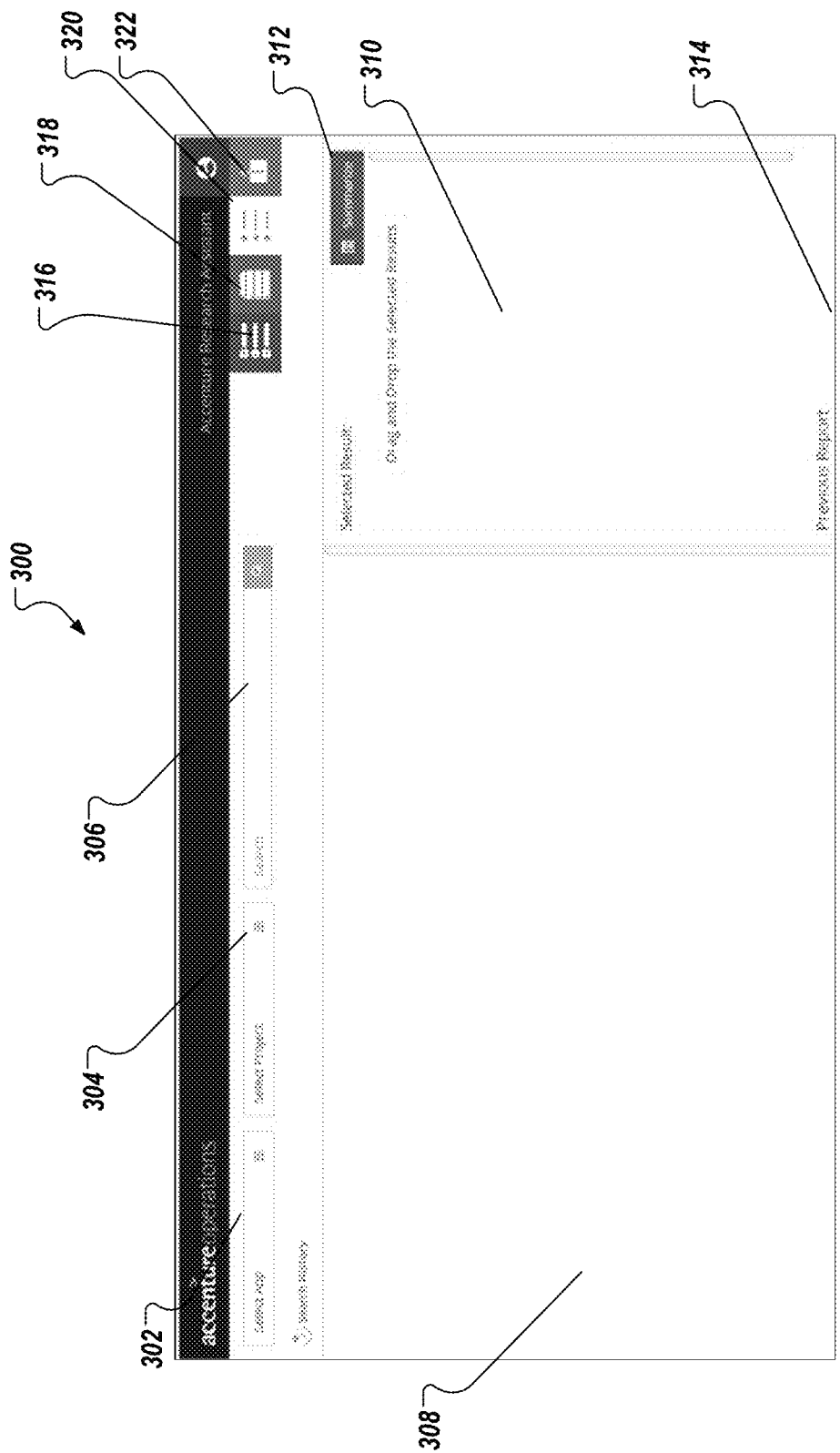
FIGS. 3A-3I depict example user interfaces in accordance with implementations of the present disclosure.

FIG. 3A depicts a search screen 300 of an example GUI. The search screen 300 includes graphical form elements including an application selection interface 302 (e.g., a dropdown menu), a project selection interface 304, a search query field 306, a search results area 308, a selected results area 310, a summarize button 312, and a previous reports area 314. In the depicted example, the example search screen 300 also includes a reporting sections tab 316, a data source tab 318, a data source upload tab 320, and a source tab 322.

In some implementations, the application selection interface 302 provides a list of applications supported by the intelligence reporting system 220, and enables the user to select a particular application. An application can include a type of electronic document (report) to be generated. Example applications include, without limitation, Category Intelligence, and Supplier Intelligence. The project selection interface 304 provides a list of projects that the generated electronic document(s) can be assigned to. In some examples, a project can include a project defined by an enterprise, and for which electronic documents are to be generated (e.g., a project to identify quality suppliers for supplying particular goods or services). The search query field 306 enables the user to enter a search query including one or more search terms.

As described in further detail herein, in response to user input of a search query, one or more data sources can be searched to provide search results that are responsive to the search query, and display the search results in the search results area 308. In some examples, the searched data sources can include pre-identified data sources (e.g., by the user, or by administrators configuring the system). Example data sources can include internal data sources (e.g., data source internal to the enterprise including previously generated reports), and external data sources (e.g., third-party search engines).

Figure 3B:
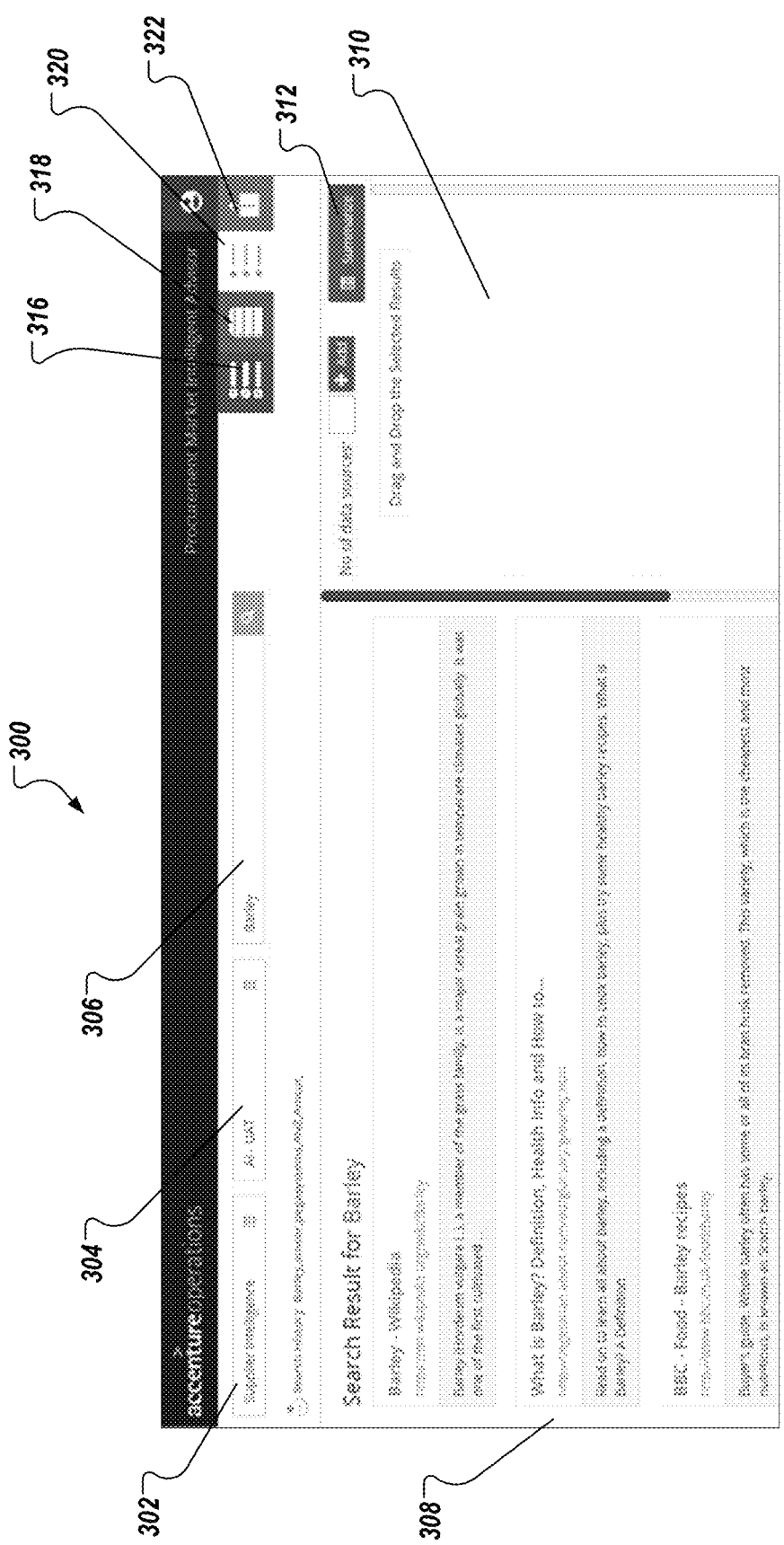

FIG. 3B depicts the example search screen 300 including search results populating the search results area 308. In the depicted example, the user has entered the search query [Barley] in the search query field 306, and has initiated a search of at least one data source (e.g., a third-party search engine) based on the search query (e.g., by clicking on a search button). The search results area 308 displays multiple search results (e.g., snippets of various web sites), each of which is responsive to the search query.

Figure 3C:
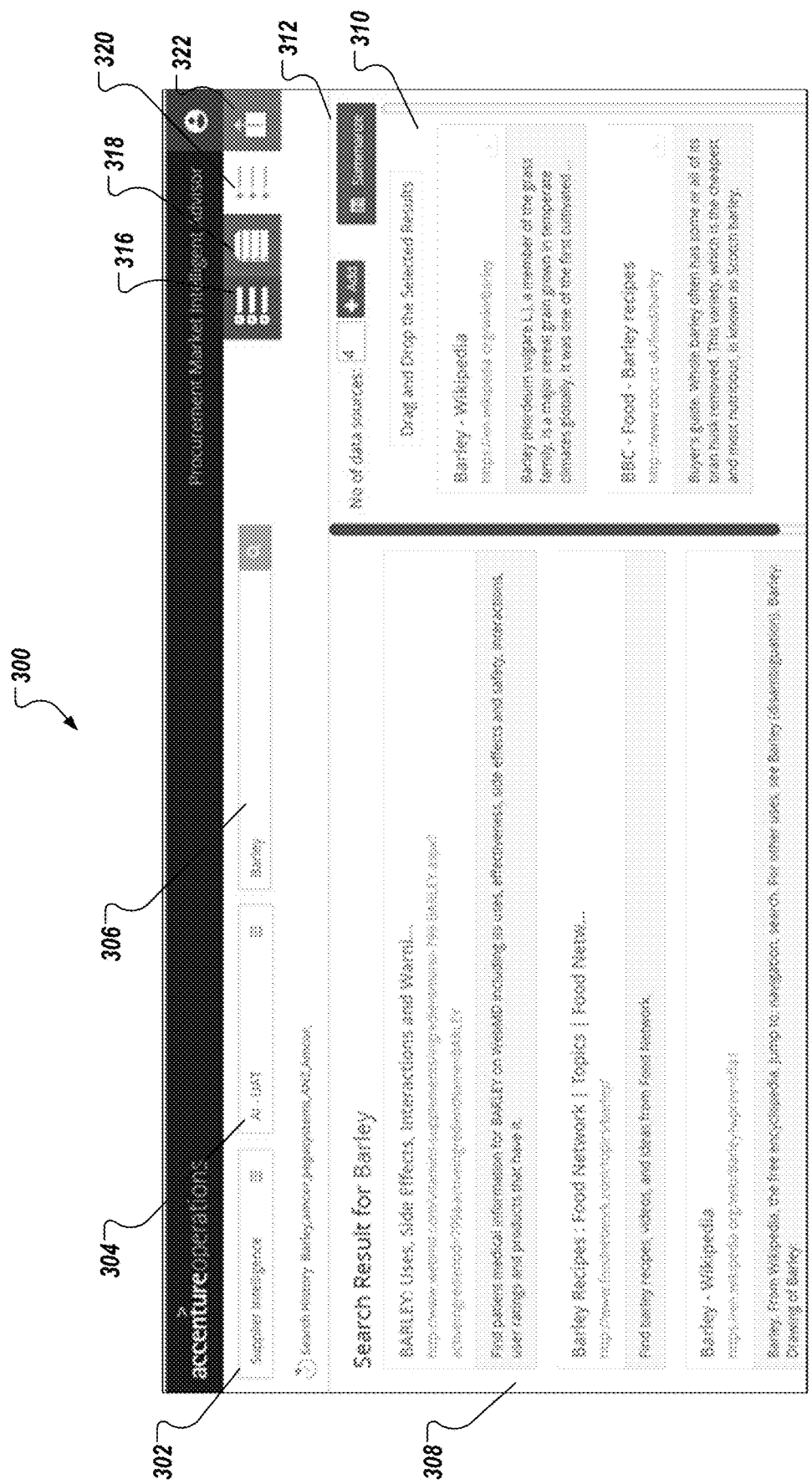

As described herein, the user can select search results that are to be used for content to populate the electronic document. With reference to FIG. 3C, the user can select a search result from the search results area 308, and can drag-drop the selected search result in the selected results area 310. In the example of FIG. 3C, the user has selected two search results.

In some implementations, one or more previously generated electronic documents can be displayed in the previous reports area 314. In some examples, a previous report can be identified based on the search query that is entered (e.g., Barley), the selected application (e.g., Supplier Intelligence), and/or the selected project. For example, generated reports can be stored in a database (e.g., the database 228 of FIG. 2), and can be indexed based on one or more of search queries used to identify data sources for generation of the respective report, selected application, and/or selected project. In some examples, a previously generated report can be retrieved from the database, and a graphical representation of the report can be displayed in the previous reports area 314, as depicted in FIG. 3C. In this manner, if an already existing report suits the user's needs, the user need not further execute report generation, and can instead refer to the previously generated report, and/or update the previously generated report.

Figure 3D:
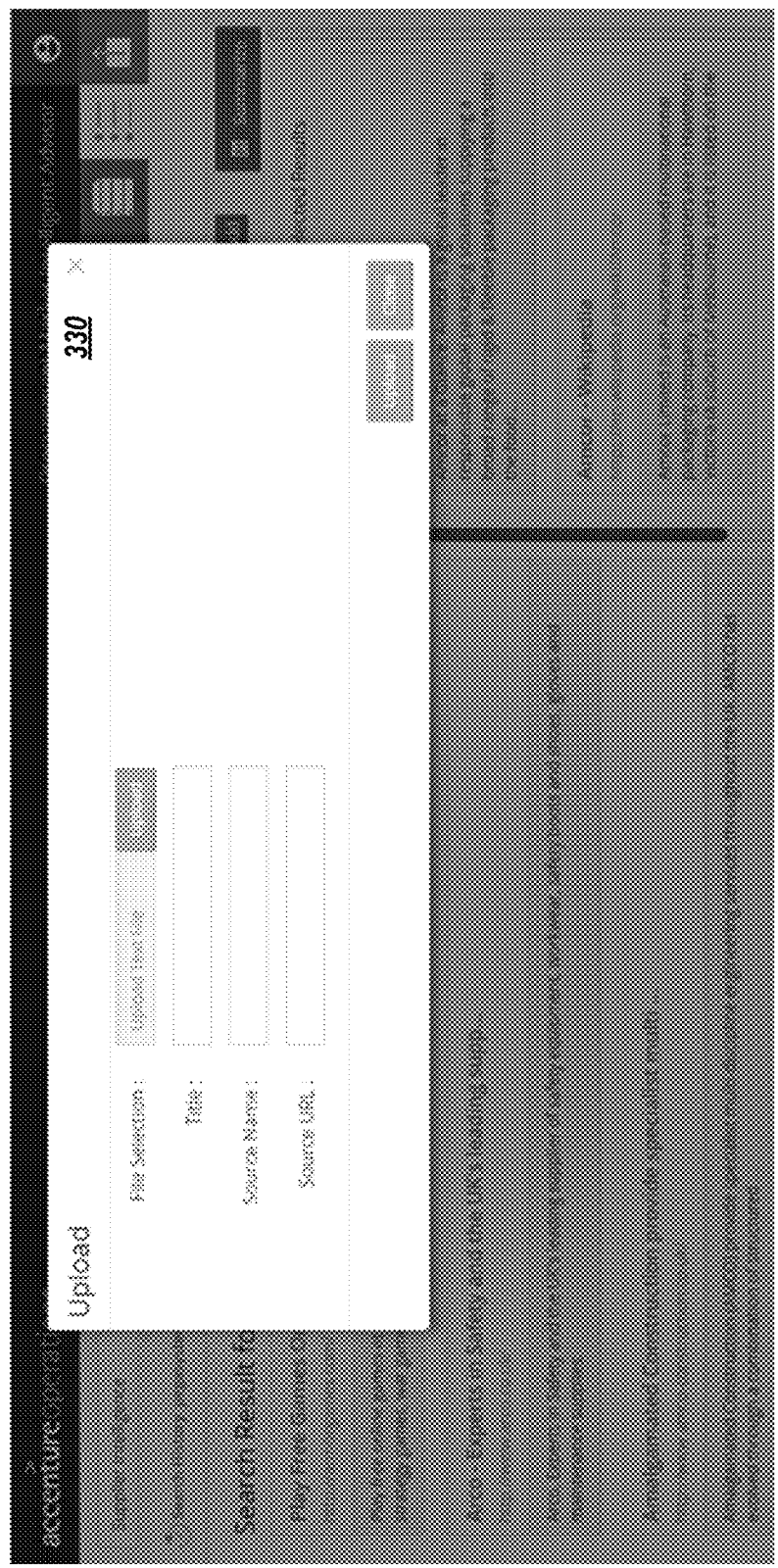

In some examples, the user can select another data source for inclusion in the selected results. For example, in response to user selection of the data source upload tab 320, an upload interface can be displayed. FIG. 3D depicts an example upload interface 330. Using the upload interface 330, the user can select a particular file to be uploaded, and can provide parameters associated with the file (e.g., title, source name, URL). In this manner, an uploaded file can be provided as another data source, from which content is to be reviewed for inclusion in a report. In response to uploading of the file, a graphical representation of the file can be displayed in the selected results area 310.

Figure 3E:
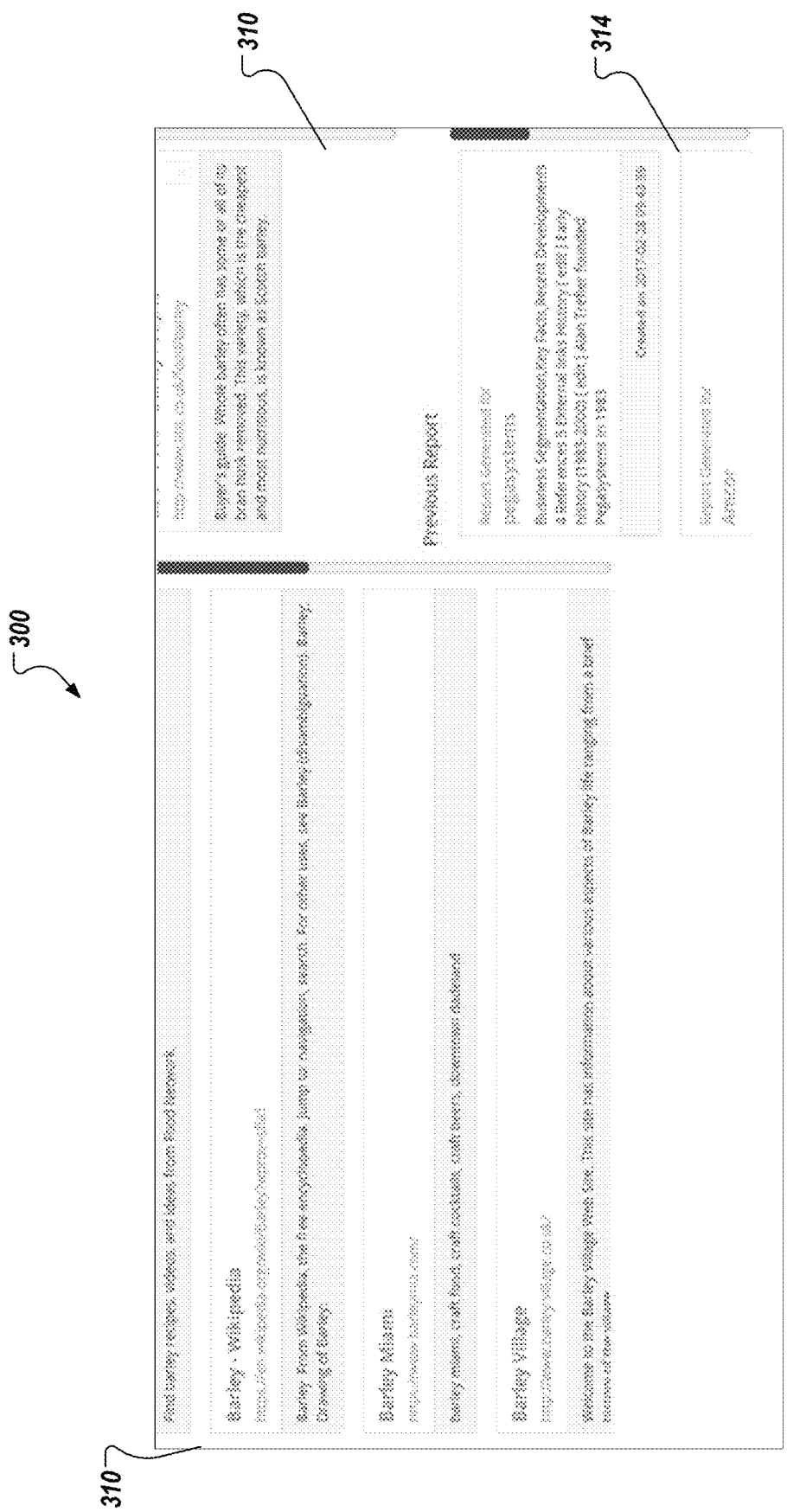

In some examples, a previously generated report can be selected as a data source. FIG. 3E depicts example previously generated reports displayed in the previous reports area 314, which can be selected for inclusion as a data source.

If the user decides to generate a summarization of the selected search results, the user selects (e.g., clicks on) the summarize button 312. In response to user selection of the summarize button 312, a summarization interface can be displayed. An example summarization interface includes a topics selection interface, a selected topics area, a summary generation button, a summary display area, and an export button. In some examples, the user selects one or more topics, which are to be used for generation of the summary. In some examples, a drop-down menu is provided from the topics selection interface, and is pre-populated with one or more topics that can be selected. In the depicted example, the user has selected the topics Overview, Recent Developments, Business Segmentation, and Key Facts. Consequently, a graphical representation of each topic can be displayed in the selected topics area (see FIG. 3F).

In some examples, the list of topics displayed in the drop-down menu is pre-defined based on the selected application. For example, because in the examples of FIGS. 3A-3E the user has selected the application Supplier Intelligence, the list of topics includes those depicted. However, if the user selects a different application (e.g., Category Intelligence), a different list of topics can be displayed. The example drop-down menu can also include a text box, through which the user can enter one or more topics (e.g., topics not already provided in the drop-down menu).

Figure 3F:
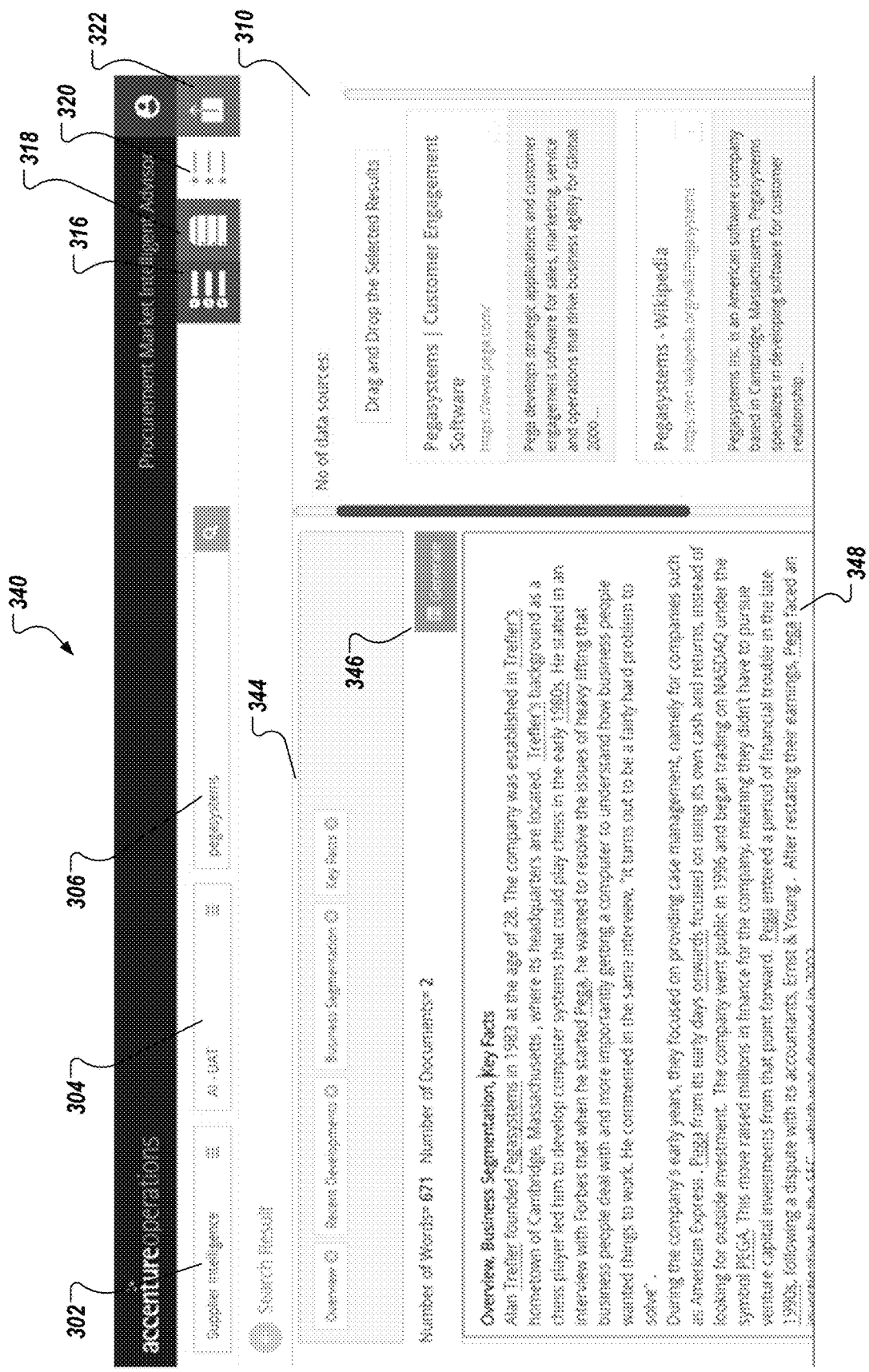

In response to user selection of the summary generation button, a summary is generated based on the selected data source(s), and the selected topic(s), and is displayed in the summary display area. FIG. 3F depicts a portion of an example summary displayed in the summary display area 348, and also depicts the selected topics area 344, and the summary generation button 346. In some examples, the user can export the summary as a report captured in an electronic document. For example, the user can select an export button (not shown) to export the summary in a pre-defined format (e.g., PDF).

Figure 3G:
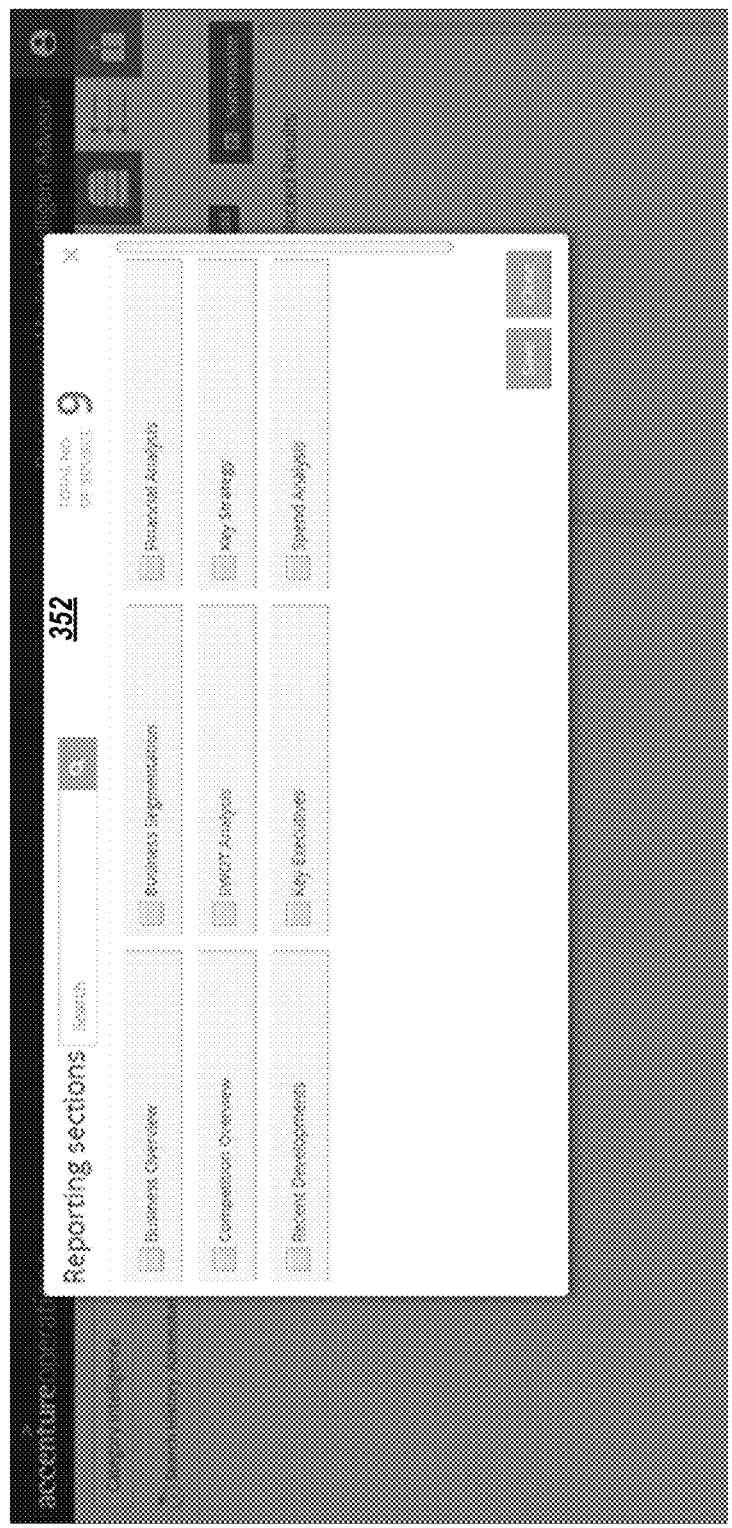
Figure 3H:
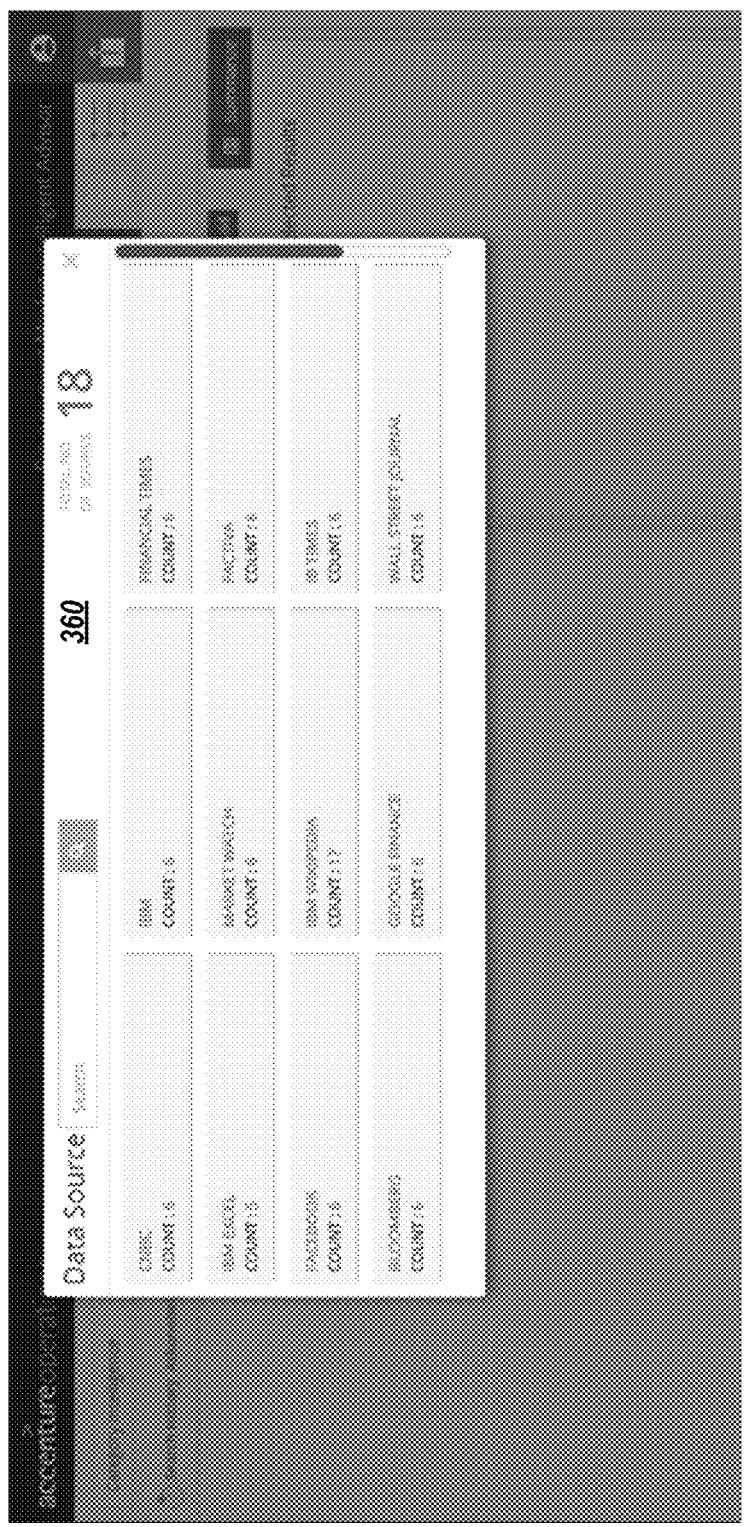
Figure 3I:
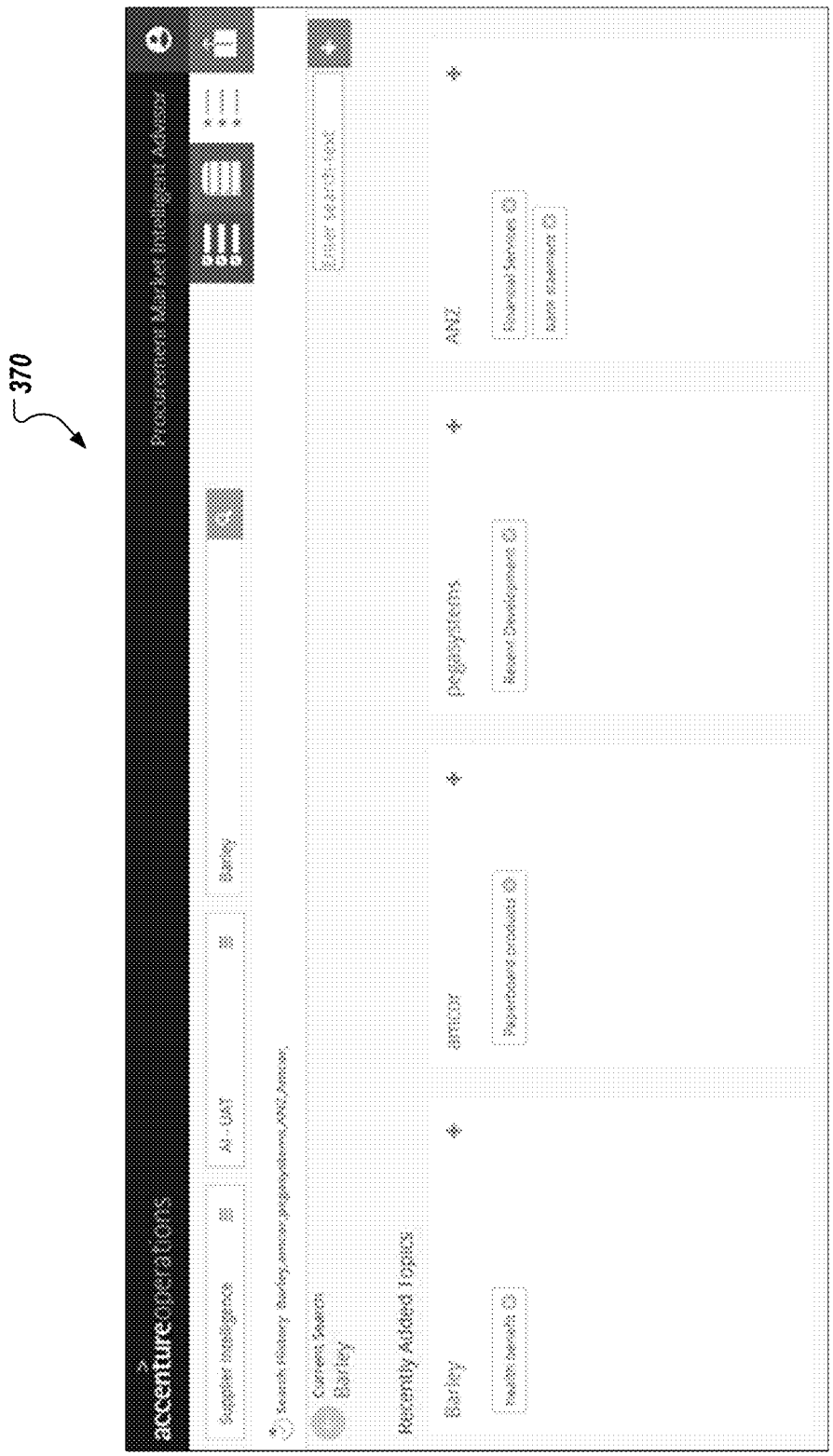

FIGS. 3G-3I depict additional interfaces and screens that can be displayed in accordance with implementations of the present disclosure.

FIG. 3G depicts an example reporting sections interface 352, which can be displayed in response to user selection of the reporting sections tab 316. In some examples, the reporting sections interface 352 includes respective graphical representations of sections that can be included in a report. In the example of FIG. 3G, example sections include Business Overview, Competition Overview, Recent Developments, Business Segmentation, SWOT (strengths, weaknesses, opportunities, and threats) Analysis, Key Executives, Financial Analysis, Key Strategy, and Spend Analysis. In some examples, the user can select one or more sections for inclusion in a to-be-generated report. FIG. 3H depicts an example data source interface 360, which can be displayed in response to user selectin of the data source tab 318. The data source interface displays respective graphical representations of data sources (e.g., web sites) that may be searched by the system.

FIG. 3I depicts an example topic management screen 370. In some examples, and as described above, each topic can include one or more sub-topics. In the example of FIG. 3I, example topics include Barley, amcor, pegasystems, and ANZ. Each topic is associated with one or more sub-topics. In some examples, the user can use the topic management screen 370 to curate topics and/or sub-topics for use in generation of reports, as described herein.

Figure 4:
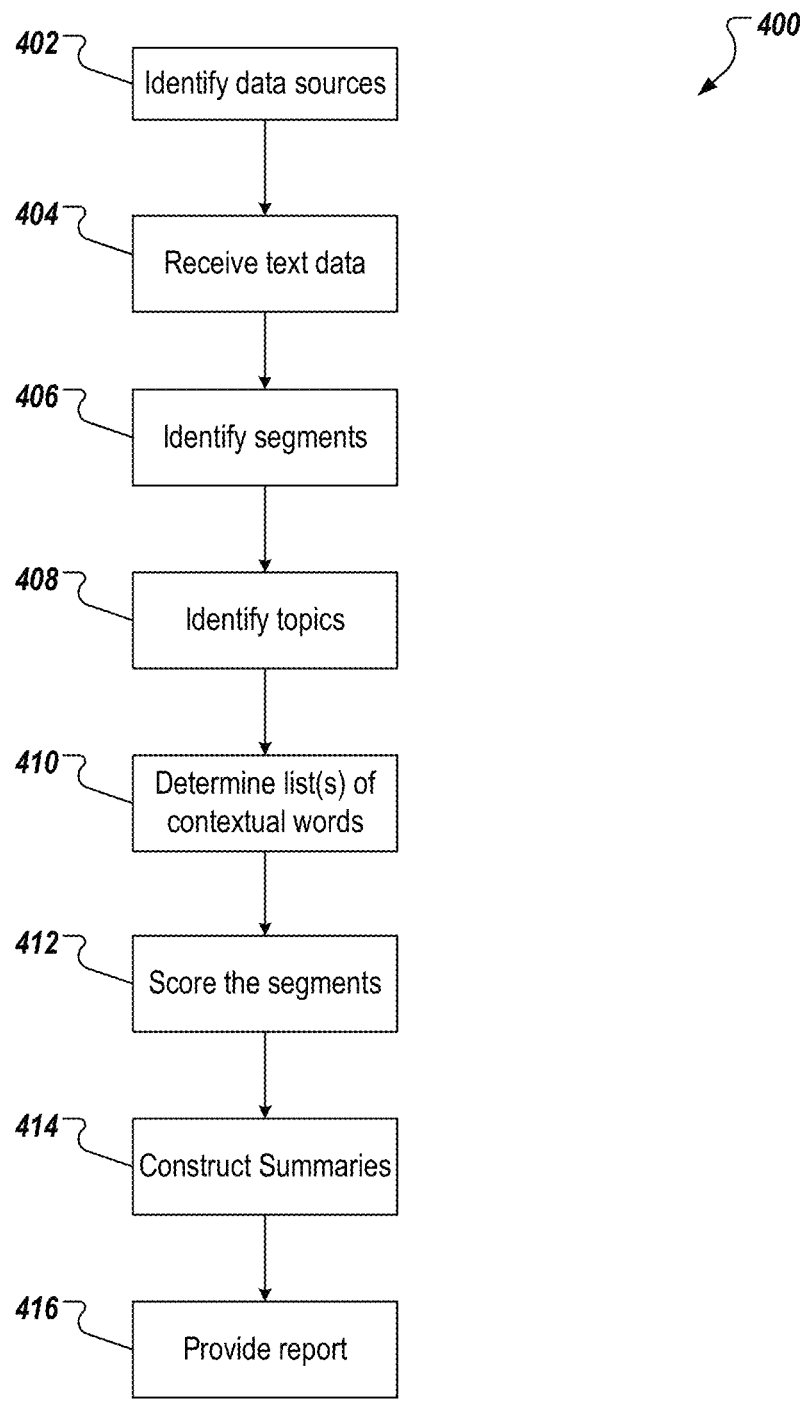
FIG. 4 depicts an example process for providing contextual data in accordance with implementations of the present disclosure.

FIG. 4 depicts an example process 400 that can be executed in accordance with implementations of the present disclosure. In some implementations, the example process 400 is provided using one or more computer-executable programs executed by one or more computing devices (e.g., the back-end system 108 of FIG. 1; by the intelligence reporting system 220 of FIG. 2). The example process 400 can be executed to provide an electronic document that summarizes content relevant to requested topics in accordance with implementations of the present disclosure.

One or more data sources are identified (402). For example, and as described above with reference to FIGS. 3B-3D, a user can select one or more data sources (e.g., websites, locally stored documents). Text data is received (404). For example, the identified data sources are crawled, and text data is copied from the respective data sources. Segments within the text data are identified (406). For example, the text data can be processed using a segmenting technique (e.g., TextTile) to identify segments within the text data.

Topics are identified (408). For example, and as described above with reference to FIG. 3E, the user can select one or more topics from a list of pre-defined topics, and/or can enter a topic. One or more lists of contextual words are provided (410). For example, for each topic, a list of contextual words is provided based on dictionary data (e.g., WordNet). Each segment is scored (412). For example, each segment is scored per topic based on the respective lists of contextual words to identify segments of the text data that are determined to be relevant to a respective topic. One or more summaries are constructed (414). For example, and as depicted in FIG. 3F, segments determined to be relevant to a topic can be concatenated to provide a summary for the respective topic. A report is provided (416). For example, and as described herein, and electronic document is generated and includes the one or more summaries (e.g., broken into groups based on topic).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing an electronic document, the method being executed by one or more processors and comprising:
　receiving, by the one or more processors, text content comprising a plurality of segments, the text content being received from one or more data sources;
　providing, by the one or more processors, a predefined list of topics based on a selected application, the selected application being selected from a list of applications and indicating a type of electronic document that is to be generated;
　receiving, by the one or more processors, a selection of a set of topics to be included in an electronic document, the set of topics comprising one or more topics selected from the predefined list of topics by a user through a graphical user interface;
　for each topic in the set of topics, providing, by the one or more processors, a set of contextual words associated with a respective topic, contextual words being determined from a lexical database, each contextual word having a respective frequency, the frequency indicating a number of times that the respective contextual word appears in definitions of the respective topic, a number of times that the respective contextual word appears in definitions of synonyms of the respective topic, and a number of times that the respective contextual word appears in examples in which the respective topic is included;
　determining, by the one or more processors, a score for each segment and topic pair, the score indicating a relevance of a respective topic to a respective segment, each score being determined based on respective contextual words of the respective topic and frequencies of the respective contextual words;
　for each topic, providing, by the one or more processors, a summary comprising at least one segment based on respective score; and
　providing, to a user device, an electronic document comprising one or more summaries, wherein the electronic document is of the type indicated by the selected application.

2. The method of claim 1, wherein the contextual words for each identified topics are synonyms, hypernyms, or a part of speech related to a respective topic.

3. The method of claim 1, wherein stop words are removed from results of the lexical database.

4. The method of claim 1, further comprising identifying one or more transitions within the text content between the set of topics using a meta-path approach.

5. The method of claim 1, wherein the text content is retrieved from at least one data source of the one or more data sources.

6. The method of claim 1, wherein at least one data source of the one or more data sources comprises a document source uploaded from a user device.

7. One or more non-transitory computer-readable storage media coupled to one or more processors and having instructions stored thereon which, when executed by the one or more processors, cause the one or more processors to perform operations for providing an electronic document, the operations comprising:
　receiving text content comprising a plurality of segments, the text content being received from one or more data sources;
　providing a predefined list of topics based on a selected application, the selected application being selected from a list of applications and indicating a type of electronic document that is to be generated;
　receiving a selection of a set of topics to be included in an electronic document, the set of topics comprising one or more topics selected from the predefined list of topics by a user through a graphical user interface;
　for each topic in the set of topics, providing a set of contextual words associated with a respective topic, contextual words being determined from a lexical database, each contextual word having a respective frequency, the frequency indicating a number of times that the respective contextual word appears in definitions of the respective topic, a number of times that the respective contextual word appears in definitions of synonyms of the respective topic, and a number of times that the respective contextual word appears in examples in which the respective topic is included;
　determining a score for each segment and topic pair, the score indicating a relevance of a respective topic to a respective segment, each score being determined based on respective contextual words of the respective topic and frequencies of the respective contextual words;
　for each topic, providing a summary comprising at least one segment based on respective score; and
　providing, to a user device, an electronic document comprising one or more summaries, wherein the electronic document is of the type indicated by the selected application.

8. The computer-readable storage media of claim 7, wherein the contextual words for each identified topics are synonyms, hypernyms, or a part of speech related to a respective topic.

9. The computer-readable storage media of claim 7, wherein stop words are removed from results of the lexical database.

10. The computer-readable storage media of claim 7, wherein the operations further comprise identifying one or more transitions within the text content between the set of topics using a meta-path approach.

11. The computer-readable storage media of claim 7, wherein the text content is retrieved from at least one data source of the one or more data sources.

12. The computer-readable storage media of claim 7, wherein at least one data source of the one or more data sources comprises a document source uploaded from a user device.

13. A system, comprising:
　one or more processors; and
　a computer-readable storage device coupled to the one or more processors and having instructions stored thereon which, when executed by the one or more processors, cause the one or more processors to perform operations for providing an electronic document, the operations comprising:
　　receiving text content comprising a plurality of segments, the text content being received from one or more data sources;
　　providing a predefined list of topics based on a selected application, the selected application being selected from a list of applications and indicating a type of electronic document that is to be generated;

receiving a selection of a set of topics to be included in an electronic document, the set of topics comprising one or more topics selected from the predefined list of topics by a user through a graphical user interface;

for each topic in the set of topics, providing a set of contextual words associated with a respective topic, contextual words being determined from a lexical database, each contextual word having a respective frequency, the frequency indicating a number of times that the respective contextual word appears in definitions of the respective topic, a number of times that the respective contextual word appears in definitions of synonyms of the respective topic, and a number of times that the respective contextual word appears in examples in which the respective topic is included;

determining a score for each segment and topic pair, the score indicating a relevance of a respective topic to a respective segment, each score being determined based on respective contextual words of the respective topic and frequencies of the respective contextual words;

for each topic, providing a summary comprising at least one segment based on respective score; and providing, to a user device, an electronic document comprising one or more summaries, wherein the electronic document is of the type indicated by the selected application.

14. The system of claim 13, wherein the contextual words for each identified topics are synonyms, hypernyms, or a part of speech related to a respective topic.

15. The system of claim 13, wherein stop words are removed from results of the lexical database.

16. The system of claim 13, wherein the operations further comprise identifying one or more transitions within the text content between the set of topics using a meta-path approach.

17. The system of claim 13, wherein the text content is retrieved from at least one data source of the one or more data sources.

18. The system of claim 13, wherein at least one data source of the one or more data sources comprises a document source uploaded from a user device.

* * * * *